US011363914B2

(12) United States Patent
Cadbury et al.

(10) Patent No.: US 11,363,914 B2
(45) Date of Patent: Jun. 21, 2022

(54) GRILLING DEVICE WITH PRESSURISED AIR SUPPLY

(71) Applicant: Active Food Systems Limited, Offord Cluny (GB)

(72) Inventors: George Justin Peter Cadbury, Nr. Didcot (GB); Sam O'Rourke, Offord Cluny (GB)

(73) Assignee: Active Food Systems Limited, Cambridgeshire (GB)

( * ) Notice: Subject to any disclaimer, the term of this patent is extended or adjusted under 35 U.S.C. 154(b) by 163 days.

(21) Appl. No.: 16/758,295

(22) PCT Filed: Oct. 17, 2018

(86) PCT No.: PCT/GB2018/052986
§ 371 (c)(1),
(2) Date: Apr. 22, 2020

(87) PCT Pub. No.: WO2019/081887
PCT Pub. Date: May 2, 2019

(65) Prior Publication Data
US 2020/0245812 A1    Aug. 6, 2020

(30) Foreign Application Priority Data

Oct. 25, 2017  (GB) ..................... 1717556

(51) Int. Cl.
*A47J 37/07*   (2006.01)
*F23D 14/62*   (2006.01)
*F23D 14/84*   (2006.01)
*F23K 5/00*    (2006.01)
*F23N 1/04*    (2006.01)
(Continued)

(52) U.S. Cl.
CPC ....... *A47J 37/0754* (2013.01); *A47J 37/0713* (2013.01); *F23D 14/62* (2013.01);
(Continued)

(58) Field of Classification Search
CPC ... A47J 37/0754; A47J 37/0713; F24C 3/126; F24C 3/047; F23D 14/84; F23D 14/62;
(Continued)

(56) References Cited

U.S. PATENT DOCUMENTS 4,788,962 A   12/1988  Mashburn et al.
5,676,049 A   10/1997  Arnold
(Continued)

FOREIGN PATENT DOCUMENTS

DE   10121415 A1   11/2002
GB   2511850 B    4/2016
(Continued)

OTHER PUBLICATIONS

European Patent Office, International Search Report in International Patent Application No. PCT/GB2018/052986, 4 pp. (dated Dec. 11, 2018).
(Continued)

*Primary Examiner* — Alfred Basichas
(74) *Attorney, Agent, or Firm* — Leydig, Voit & Mayer, Ltd.

(57) ABSTRACT

Cooking apparatus for cooking food by a barbecue grilling method, comprises an outer housing receiving an inner housing which defines a heating volume. A chamber for pressurised air is defined between the outer and inner housings. Apertures in the inner housing allow pressurised air to exit the chamber into the heating volume. At least one burner is located in the inner housing. A combustible fuel/air mixture is supplied to the burner and this is separate from the supply of pressurised air to the chamber. A cooking surface is placed across the top of the heating volume to support food to be cooked.

13 Claims, 4 Drawing Sheets

(51) Int. Cl.
    *F24C 3/04*          (2021.01)
    *F24C 3/12*          (2006.01)

(52) U.S. Cl.
    CPC ............. *F23D 14/84* (2013.01); *F23K 5/007* (2013.01); *F23N 1/047* (2013.01); *F24C 3/047* (2013.01); *F24C 3/126* (2013.01); *F23K 2900/05002* (2013.01)

(58) Field of Classification Search
    CPC . F23N 1/047; F23K 5/007; F23K 2900/05002
    See application file for complete search history.

(56) References Cited

U.S. PATENT DOCUMENTS

| | | |
|---|---|---|
| 6,651,646 B1 | 11/2003 | Loyd et al. |
| 2006/0051719 A1* | 3/2006 | Mashburn ........... A47J 37/0704 |
| | | 431/354 |
| 2017/0095106 A1 | 4/2017 | Cook |

FOREIGN PATENT DOCUMENTS

| | | |
|---|---|---|
| WO | WO 2006/029072 A2 | 3/2006 |
| WO | WO 2014/204852 A1 | 12/2014 |

OTHER PUBLICATIONS

European Patent Office, Written Opinion in International Patent Application No. PCT/GB2018/052986, 6 pp. (dated Dec. 11, 2018).
United Kingdom Intellectual Property Office, Search Report in GB1717556.3, 1 p. (dated Mar. 26, 2018).

\* cited by examiner

GRILLING DEVICE WITH PRESSURISED AIR SUPPLY

CROSS-REFERENCE TO RELATED APPLICATIONS

This application is a national phase application of International Patent Application No. PCT/GB2018/052986, filed Oct. 17, 2018, which claims priority to Great Britain Patent Application No. GB1717556.3, filed Oct. 25, 2017, both of which are incorporated by reference herein in their entireties for all purposes.

TECHNICAL FIELD

The present invention relates to apparatus for cooking food by a barbecue grilling method.

BACKGROUND

U.S. Pat. No. 5,676,049 describes a barbecue cooking appliance which provides first and second sources of pressurised air to improve combustion efficiency. GB2511850 describes a similar type of cooking appliance with a combustion mixture inlet assembly for controlling the flow of air and fuel to the burner.

SUMMARY OF THE INVENTION

The present invention provides a cooking apparatus for cooking food by a barbecue grilling method, the apparatus comprising an outer housing, an inner housing received in the outer housing and defining a heating volume, a chamber for pressurised air between the outer housing and the inner housing, means to supply pressurised air into the chamber, a plurality of apertures in the inner housing to allow pressurised air to exit the chamber and enter the heating volume, a least one burner located in the inner housing, means to supply a fuel and air mixture to the burner which is separate from the supply of pressurised air into the chamber, and a cooking surface for supporting food.

In this apparatus, the supply of pressurised air into the chamber is separate from the supply of fuel and air to the burner. Pressurised air entering the heating volume via the apertures in the inner housing tends to pull the flame from the burner out across the base of the inner housing, heating the inner housing to provide an additional source of radiant heat for cooking food. In this way, high temperatures can be achieved to fully vaporise fats and oils from the food, while retaining excellent fuel efficiency.

In one embodiment, the cooking surface may be above the heating volume.

In another embodiment, the cooking apparatus may further comprise a top wall which is above the heating volume and which is connected to the inner housing, wherein the heating volume is enclosed by the inner housing and the top wall; wherein the cooking surface is located within the heating volume.

The means to supply a fuel and air mixture to the burner comprises a variable speed fan and a Venturi valve supplying varying levels of gas.

In this arrangement, the cooking apparatus may further comprise a thermostat for controlling the speed of the variable speed fan.

Preferably, the inner housing may comprise a base and side walls and at least one aperture may be provided towards one end of each side wall and adjacent to a corner where the side wall joins the next side wall. In this way, air flowing through the apertures from the chamber into the heating volume tends to form a vortex air flow which swirls around the heating volume. This helps to pull the flame out across the inner housing utilising the vortex air speed to decrease the relative air pressure compared to the centre burner pressure.

Preferably, the cooking apparatus further comprises a support structure located between the inner housing and the outer housing, configured to support the burner and provide a passage for the supply of the combustible fuel/air mixture to the burner which is separated from the supply of pressurised air to the chamber. The support structure strengthens the apparatus and prevents distortion as parts expand as they heat up.

BRIEF DESCRIPTION OF THE DRAWINGS

The invention will now be described in detail, by way of example only, with reference to the accompanying drawings in which.

DETAILED DESCRIPTION OF THE INVENTION

Figure 1:
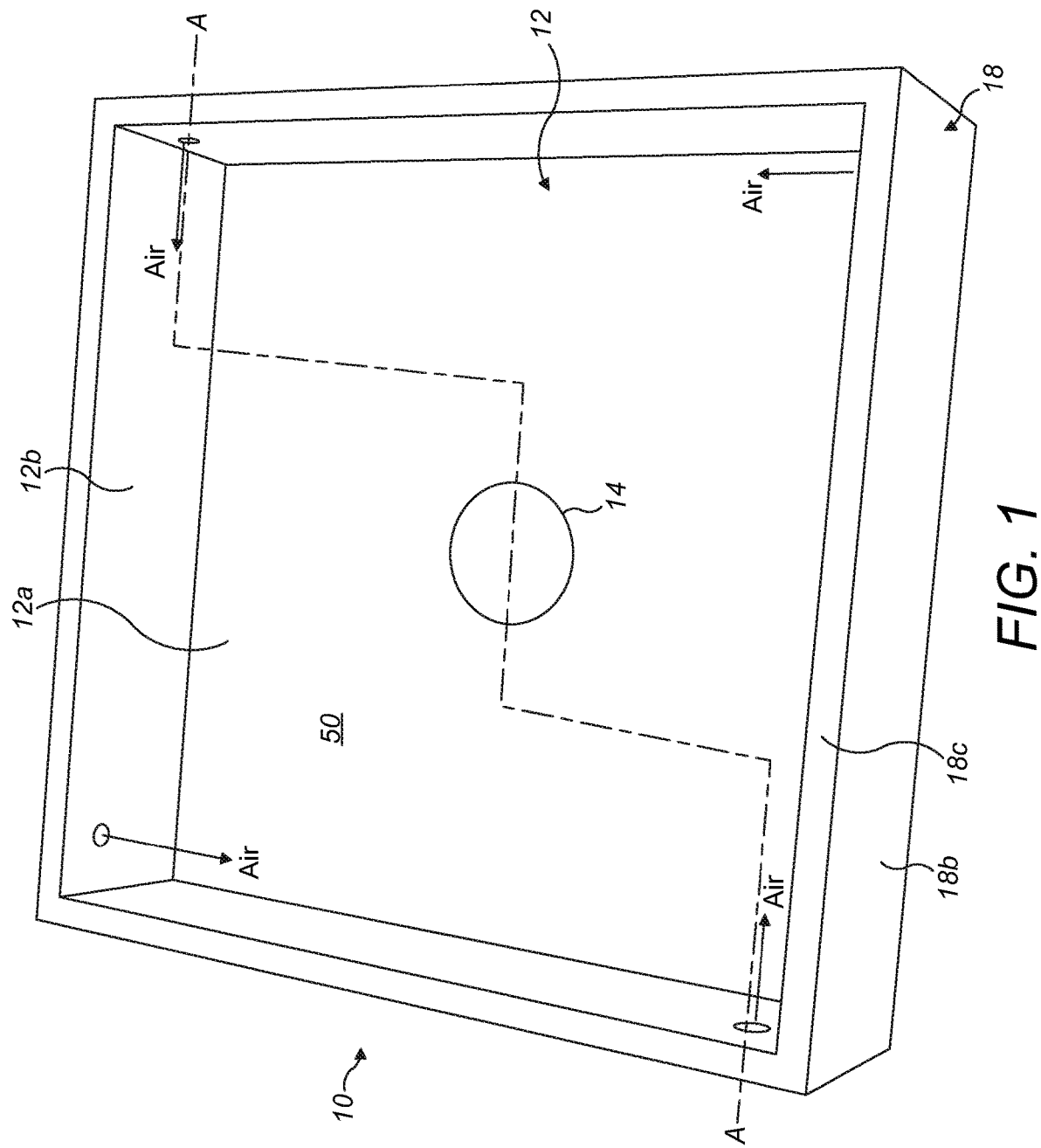
FIG. 1 is a perspective view of the inner and outer housings of the cooking appliance in accordance with one embodiment of the present invention.
Figure 2:
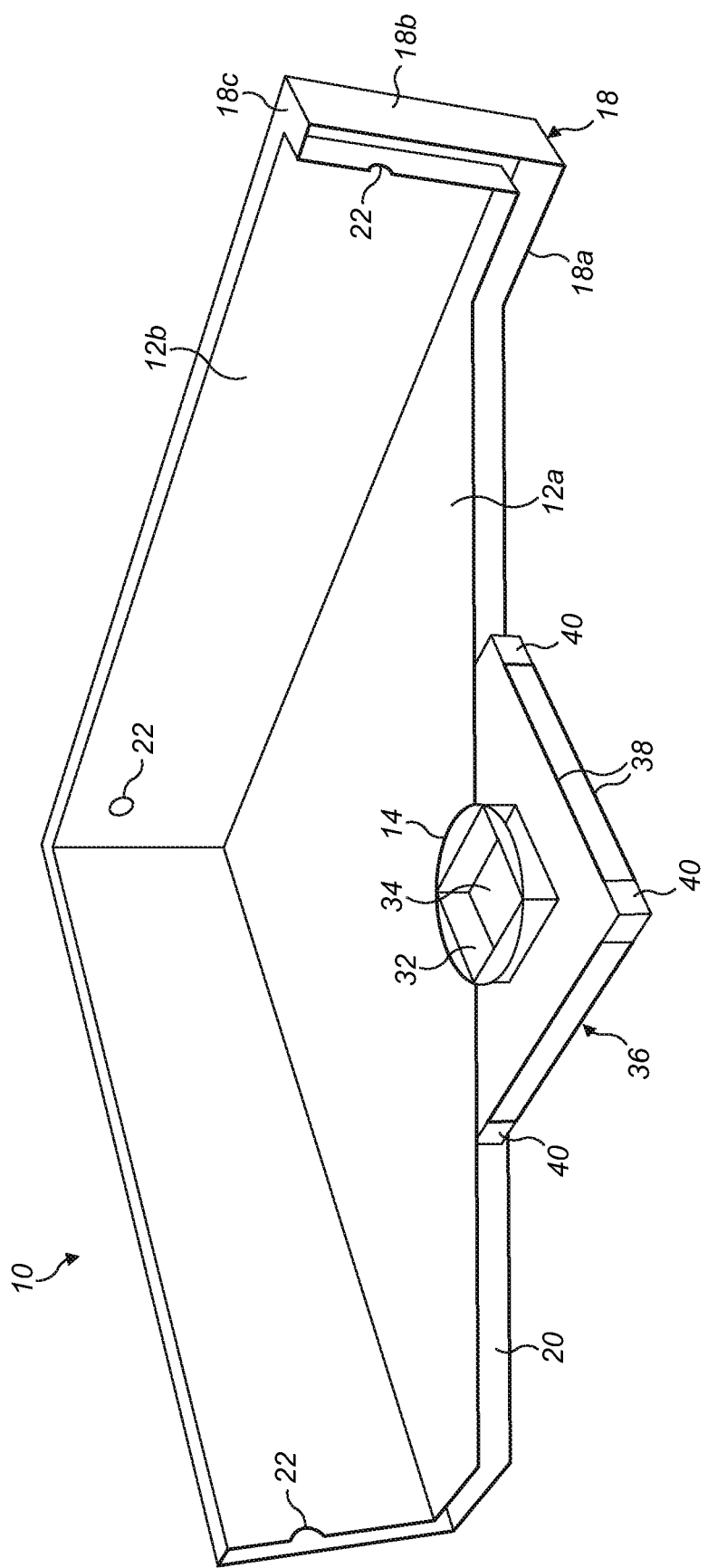
FIG. 2 is a cutaway view of the appliance of FIG. 1 along the line AA.

FIGS. 1 and 2 illustrate schematically a cooking apparatus 10 in accordance with one embodiment of the present invention.

The cooking apparatus 10 comprises a base assembly 12 which forms an inner housing. The base assembly 12 comprises a base 12a and side walls 12b defining a heating volume 50. The base assembly 12 is preferably formed from a ceramic material. In this example, the base assembly 12 is provided with a central aperture 14 for receiving a conventional gas burner 16. However, in larger appliances, more than one aperture and more than one burner may be provided.

An outer housing 18 receives the base assembly 12. The outer housing 18 is spaced from the side walls 12b of the base assembly 12 to define an air chamber 20 between them. The outer housing 18 comprises a base wall 18a, side walls 18b and an upper wall 18c as illustrated in FIG. 2.

Each side wall 12b of the base assembly 12 is formed with at least one aperture 22 communicating between the air chamber 20 and the heating volume 50. Preferably, the aperture 22 is located towards one end of a respective side wall 12b, adjacent to a corner where that side wall joins the next side wall. Preferably the apertures 22 are evenly spaced from each other around all the side walls 12b.

The base wall 18a of the outer housing 18 defines a first opening 24 connected to a supply of pressurised air, in particular a first fan 26. The first fan 26 supplies air into the chamber 20. Pressurised air passes out of the chamber 20 via the apertures 22 into the heating volume 50 as shown by the arrows in FIGS. 1 and 3.

The base wall 18a of the outer housing 18 defines a second opening 28 connected to a source of a combustion mixture of fuel, typically gas, and air. In particular, this comprises a Venturi gas valve linked to a variable speed fan second fan 30. The opening 28 is preferably located directly below the aperture 14 in the base assembly 12. The apertures 14 and 28 are joined by a wall 32 defining a passage 34 from the second fan 30 directly to the burner 16. The passage 34 is therefore isolated from the air chamber 20 by the wall 32.

As best seen in FIG. 2, a support structure 36 (also known as a sandwich plate) may be located between the base wall 12a of the base assembly 12 and the base wall 18a of the outer housing 18. The support structure 36 strengthens the apparatus 10, helping to support the burner 16. It provides the passage 34 for the fuel/air mixture from the second fan 30 to the burner 16 and prevents distortion as the various parts of the apparatus 10 expand as they heat up.

The support structure 36 comprises a pair of parallel plates 38, which are typically square or rectangular but may be any shape (although only part is shown in FIG. 2 protruding from the between the inner and outer housings), joined by corner pieces 40. The wall 32 also extends between the plates 38 in the centre of the support structure 36.

In use, pressurised air is supplied into the chamber 20 by the first fan 26 and the gas/air mixture is supplied to the burner 16 by the second fan 30. Due to the location of the apertures 22 near each corner of the base assembly 12, air flowing out of the chamber 20 via the apertures 22 tends to swirl around the heating volume 50 creating a vortex which, in the FIG. 1 arrangement would flow in an anticlockwise direction. However, rotation in any direction is permissible.

The gas and air mixture supplied to the burner 16 is at a higher pressure than the vortex of air flowing around the heading volume 50. Therefore, the vortex tends to pull the flame from the burner 16 outwardly across the base wall 12a. This heats up the ceramic material of the base assembly 12 providing a further source of radiant heat. In this way a high temperature can be achieved, ensuring that combustion occurs as efficiently as possible and cooking the food quickly whilst completely combusting fats and oils from the food. Therefore, it is not necessary to provide a drip tray to collect excess fats and oils and carbon deposits on the food or the cooking apparatus are minimised or eliminated.

In one embodiment, a grill rack 44, or solid conductive plate, (shown schematically in FIG. 3) is placed across the top of the heating volume 50 and receives food to be cooked. Radiant heat from the ceramic base assembly and the flame itself cook the food directly via the grill or conductive plate.

Figure 4:
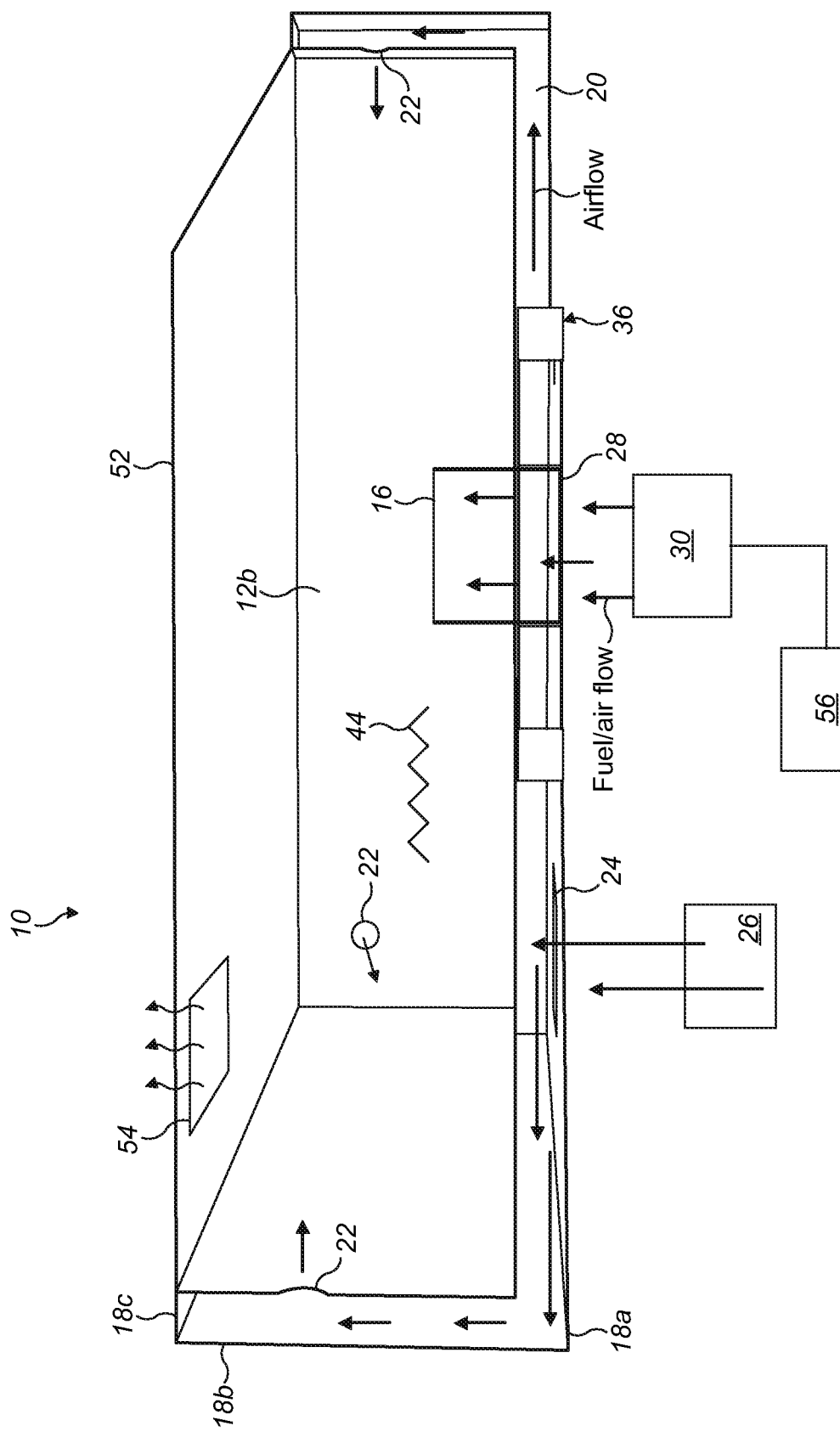
FIG. 4 is cutaway view illustrating a second embodiment cooking appliance of the present invention, and which illustrates the airflow in the appliance.

In another embodiment, a top wall 52 may be provided above the heating volume 50, as shown in FIG. 4. In this embodiment, the top wall 52 is connected to the top of the side walls 12b of the base assembly 12, such that the heating volume 50 is enclosed by the base assembly 12 and the top wall 52. In this embodiment, the grill rack 44, or other solid conductive plate, is then located within the heating volume 50 to allow food to be cooked therein. In this embodiment, an appropriate extraction means is provided to allow air to escape from the heating volume 50. In the case of FIG. 4, the extraction means is shown as a vent 54 in the top wall 52.

Figure 3:
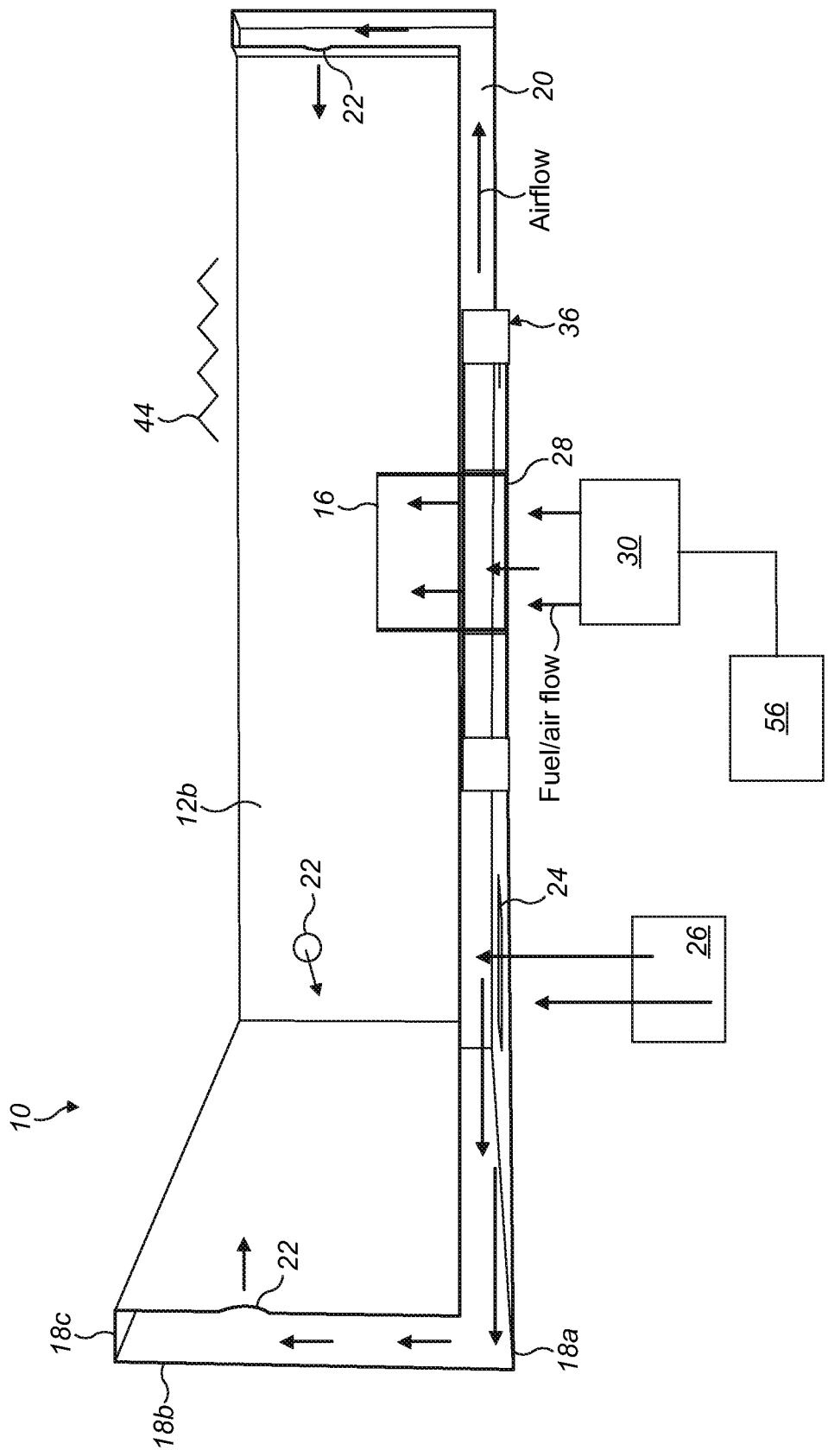
FIG. 3 is another cutaway view illustrating the airflow in the appliance.

In some cases, when a large quantity of food is being cooked, the cooking apparatus can become extremely hot, with the risk that food will burn rather than cook through properly. Therefore, the use of an adjustable second fan 30 supplying the gas and air mixture to the burner is advantageous. In one particular embodiment, the cooking apparatus may be further provided with a thermostat 56 electronically connected to the second fan 30 for controlling the speed of the second fan 30, as shown in FIGS. 3 and 4.

When the second fan 30 is adjustable, the gas/air mixture can be turned up or down as required. In particular, when the cooking apparatus 10 is first switched on and it is desirable to heat it up quickly so that it becomes ready for cooking as soon as possible, the fan 30 can be turned up so that the gas/air mixture to the burner 16 is increased. Once the apparatus 10 has heated up, in particular the base assembly 12, and if a large quantity of food is being cooked, the supply of gas/air to the burner can be turned down to avoid overheating and burning. Use of a Venturi valve in the second fan 30 is particularly helpful to provide full adjustability of the gas/air mixture.

Whilst it is preferable to have the aperture 14 and the gas burner 16 located in a central position on the base assembly 12, it will be appreciated that other positions of the aperture 14 and the gas burner 16 in relation to the base assembly 12 are possible.

The invention claimed is:

1. Cooking apparatus for cooking food by a barbecue grilling method, the apparatus comprising an outer housing, an inner housing received within the outer housing defining a heating volume, a chamber for pressurised air defined between the outer housing and the inner housing, means to supply pressurised air into the chamber, a plurality of apertures in the inner housing communicating with the chamber to allow pressurised air to exit the chamber into the heating volume, at least one burner located in the inner housing, means to supply a combustible fuel/air mixture to the burner which is separate from the supply of pressurised air to the chamber, and a cooking surface for supporting food, wherein the means to supply a combustible fuel/air mixture to the burner comprises a Venturi gas valve linked to a variable speed fan.

2. Cooking apparatus as claimed in claim 1, wherein the cooking surface is above the heating volume.

3. Cooking apparatus as claimed in claim 2, wherein the inner housing comprises a base and side walls and wherein at least one aperture is provided in each side wall towards one end of the side wall and adjacent a corner where the side wall joins another side wall.

4. Cooking apparatus as claimed in claim 2, further comprising a support structure located between the inner housing and the outer housing, configured to support the burner and provide a passage for the supply of the combustible fuel/air mixture to the burner which is separated from the supply of pressurised air to the chamber.

5. Cooking apparatus as claimed in claim 1, further comprising a top wall which is above the heating volume and which is connected to the inner housing, wherein the heating volume is enclosed by the inner housing and the top wall; wherein the cooking surface is located within the heating volume.

6. Cooking apparatus as claimed in claim 5, wherein the inner housing comprises a base and side walls and wherein at least one aperture is provided in each side wall towards one end of the side wall and adjacent a corner where the side wall joins another side wall.

7. Cooking apparatus as claimed in claim 5, further comprising a support structure located between the inner housing and the outer housing, configured to support the burner and provide a passage for the supply of the combustible fuel/air mixture to the burner which is separated from the supply of pressurised air to the chamber.

8. Cooking apparatus as claimed in claim 1, further comprising a thermostat for controlling the speed of the variable speed fan.

9. Cooking apparatus as claimed in claim 8, wherein the inner housing comprises a base and side walls and wherein at least one aperture is provided in each side wall towards one end of the side wall and adjacent a corner where the side wall joins another side wall.

10. Cooking apparatus as claimed in claim 8, further comprising a support structure located between the inner housing and the outer housing, configured to support the burner and provide a passage for the supply of the combustible fuel/air mixture to the burner which is separated from the supply of pressurised air to the chamber.

11. Cooking apparatus as claimed in claim 1, wherein the inner housing comprises a base and side walls and wherein at least one aperture is provided in each side wall towards one end of the side wall and adjacent a corner where the side wall joins another side wall.

12. Cooking apparatus as claimed in claim 11, further comprising a support structure located between the inner housing and the outer housing, configured to support the burner and provide a passage for the supply of the combustible fuel/air mixture to the burner which is separated from the supply of pressurised air to the chamber.

13. Cooking apparatus as claimed in claim 1, further comprising a support structure located between the inner housing and the outer housing, configured to support the burner and provide a passage for the supply of the combustible fuel/air mixture to the burner which is separated from the supply of pressurised air to the chamber.

* * * * *